(12) United States Patent
Cannon et al.

(10) Patent No.: US 8,307,771 B2
(45) Date of Patent: Nov. 13, 2012

(54) ROW CLUTCH DEVICE FOR PLANTING IMPLEMENT

(75) Inventors: Will Cannon, Newton, IA (US); Theodore Van Drimmelen, Newton, IA (US)

(73) Assignee: Ag Leader Technology, Ames, IA (US)

( * ) Notice: Subject to any disclaimer, the term of this patent is extended or adjusted under 35 U.S.C. 154(b) by 45 days.

(21) Appl. No.: 12/228,075

(22) Filed: Dec. 30, 2008

(65) Prior Publication Data

US 2010/0162931 A1 Jul. 1, 2010

(51) Int. Cl.
*A01C 15/00* (2006.01)
*F16D 11/00* (2006.01)
*F16D 23/00* (2006.01)

(52) U.S. Cl. ..................... 111/200; 192/30 R

(58) Field of Classification Search .................. 111/200; 192/30 R–37, 41 R, 45.1–48.6
See application file for complete search history.

(56) References Cited

U.S. PATENT DOCUMENTS

| 5,632,212 | A | * | 5/1997 | Barry | 111/200 |
| 2005/0284350 | A1 | * | 12/2005 | Ptacek | 111/177 |
| 2007/0151492 | A1 | | 7/2007 | Dillman | |
| 2007/0151824 | A1 | | 7/2007 | Dillman | |
| 2008/0110382 | A1 | * | 5/2008 | Brockmeier | 111/184 |

OTHER PUBLICATIONS

Collection of pictures and drawings of Commercial Planters.
Momsem, Inc.—The Precision Vacuum Planter documentation and pictures.
Great Plains Planter—photos.

* cited by examiner

*Primary Examiner* — Christopher J. Novosad
(74) *Attorney, Agent, or Firm* — Kent A. Herink

(57) ABSTRACT

Disclosed is a control apparatus for a planter implement having a drill shaft and at least one row unit including a seed meter. A clutch unit is mounted inside the row unit so that it is protected against contact and damage by crop debris and other material passing by the planting implement. An input of the clutch driven off of the drill shaft of the planting implement and an output of the clutch is operably connected to the seed meter so that operation of the clutch unit interrupts dispensing of seed by the seed meter. The clutch unit is controlled by an electrical control system to limit or prevent overlap of seed being planted by the planting implement.

7 Claims, 6 Drawing Sheets

ROW CLUTCH DEVICE FOR PLANTING IMPLEMENT

BACKGROUND OF THE INVENTION

The invention relates generally to planting implements and, more specifically, to a clutch that controls the operation of a seed meter on a planting implement to reduce planter overlap.

In many parts of the world row crops must be planted in a short timeframe to achieve maximum yield. Farmers seeking to expand their cropland must do it without expanding the duration of planting beyond the optimum time period. Because farmers find it more efficient to use a wider planter instead of adding another planter and operator, planter manufacturers have expanded row crop planter widths. However, one undesired condition that gets worse as planter width increases is overlap.

Overlap occurs each time planter passes intersect (FIG. 1). Wider planters produce greater overlap because all rows are planting whenever the planter is moving and row units are engaged with the soil. Farmers experience economic loss in overlap areas because seed is wasted and yield is reduced compared to non-overlap areas. Essentially overlap areas are planted twice or more depending on the number of intersecting passes. Extra plants in overlap areas take soil nutrients and moisture from the intended plants, which results in reduced yield compared to non-overlap areas. Farmers contend with these conditions at end rows, point rows and waterways.

Electric actuated drill shaft clutches are recognized as the first device to reduce overlap on row crop planters. These clutches turn groups or sections of seeding units (called rows) on and off. The planter operator manually turns these clutches on and off when the planter section intersects another pass.

Electric drill shaft clutches turn rows on and off by controlling a section of the drill shaft. The drill shaft spans across the planter toolbar and rotates at a speed proportional to the speed of the planter. Row units, each containing a seed meter device, are attached to the planter toolbar. Each row's seed meter is mechanically connected (commonly with a chain) to the drill shaft. Each drill shaft section turns a bank of rows on and off at the same time. The electric clutch turns seeding on and off by mechanically engaging and disengaging the drill shaft section to the planter transmission. Smaller width planters are typically made with one drill shaft section. Larger width planters are commonly made with two to four drill shaft sections to allow for planter folding. Each drill shaft section is fitted with a drill shaft clutch.

Other prior art is a pneumatic actuated sprocket clutch that controls each row independently, such as those described in published U.S. patent applications 2007/0151,492 and 2007/0151,824. Pneumatic actuated clutches are electrically controlled by an electric over air valve. The drill shaft must be removed for sprocket clutch installation, repair or replacement.

Electrical current requirements of the electric over air valve are much less compared to an electric drill shaft clutch. Another advantage of sprocket clutches over drill shaft clutches is that the planter can be subdivided into more sections without creating more drill shaft sections. This is beneficial for retrofit installations.

Another prior art is a pneumatic actuated clutch mounted outside the row unit at the seed meter input shaft. The advantage of this over the sprocket clutch is installation doesn't require removal of the drill shaft. A big disadvantage is that the clutch is exposed to flying debris from planter lift wheels.

Initially the planter operator manually turned all the aforementioned clutches or planter sections on and off manually. In practice, most operators find it difficult to do this accurately because the planter is moving and they need to observe other machine functions. More planter sections make the task more difficult.

SUMMARY OF THE INVENTION

The present invention consists of apparatus including an electrically controlled clutch for controlling the operation of a seed meter of a planter implement. The clutch is interposed between an input drive chain driven by a drill shaft of the planter and an output drive chain that drives the seed meter. The clutch is located inside the row unit of the planter where it is protected against contact with and damage by debris thrown up by the planter during use. The apparatus allows direct control over planting by the seed meter of each individual row unit. Electrical energy for operating the clutches is amply provided by the standard electrical systems of tractors used in pulling and powering the planter implement. Retrofitting of existing planter implements to use the present invention is fast and easy. Further, repair or replacement of the clutches does not require removal of the drill shaft as is often required in known planter control apparatus.

The present invention may be advantageously controlled by existing agricultural control systems, such as the SeedCommand™ system of Ag Leader Technology, Ames, Iowa, which will eliminate the error prone manual operation of clutched planter sections. The SeedCommand™ system is an electronic control and GPS system that automatically controls all the clutches of the present invention by mapping planted field areas. The system automatically shuts off clutched planter sections when the sections encounter a planted area. Sections are automatically turned on when they encounter an unplanted area. Overlap is consistently minimized and the operator can pay more attention to other machine functions at pass intersections.

BRIEF DESCRIPTION OF THE FIGURES

FIG. 4a is a detail perspective view of an electrically controlled clutch of the present invention mounted inside the row unit of a planter for controlling dispensing of seed from an associated seed meter, and FIG. 4b is an enlarged view corresponding to FIG. 4a.

DESCRIPTION OF THE INVENTION

Figure 1:
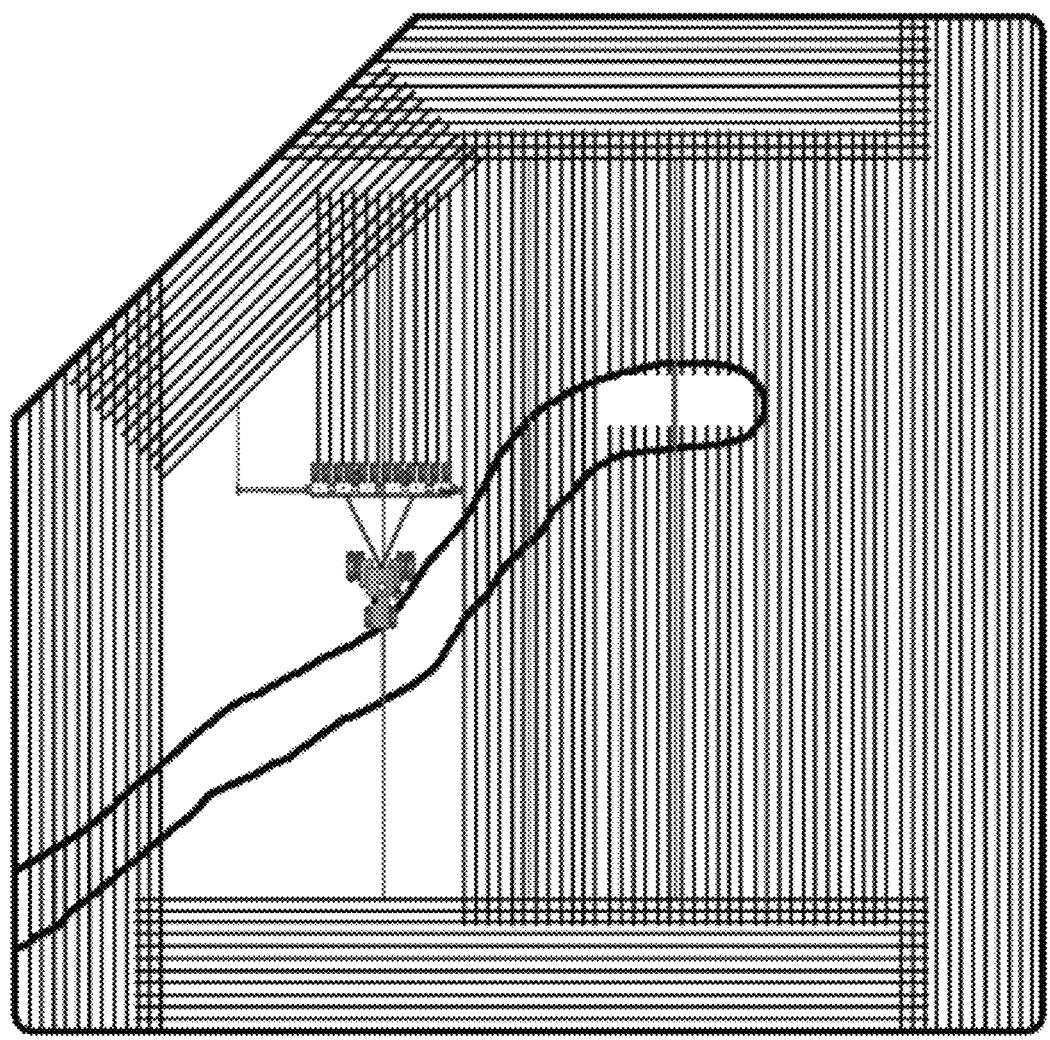
FIG. 1 is a schematic diagram showing overlap of planting using a planter without control of individual row units.
Figure 2:
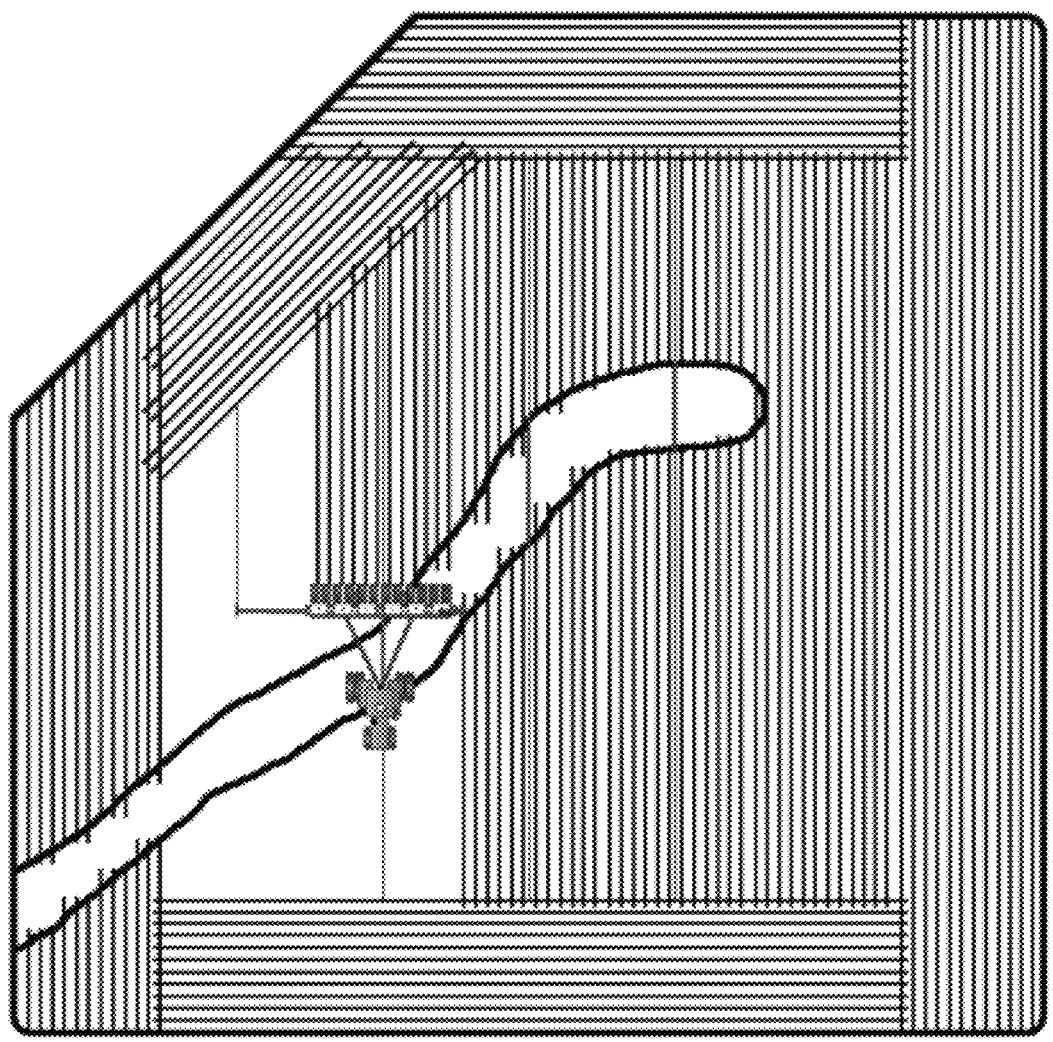
FIG. 2 is a schematic diagram showing the reduction in overlap achieved with clutches associated with groups of row units.
Figure 3:
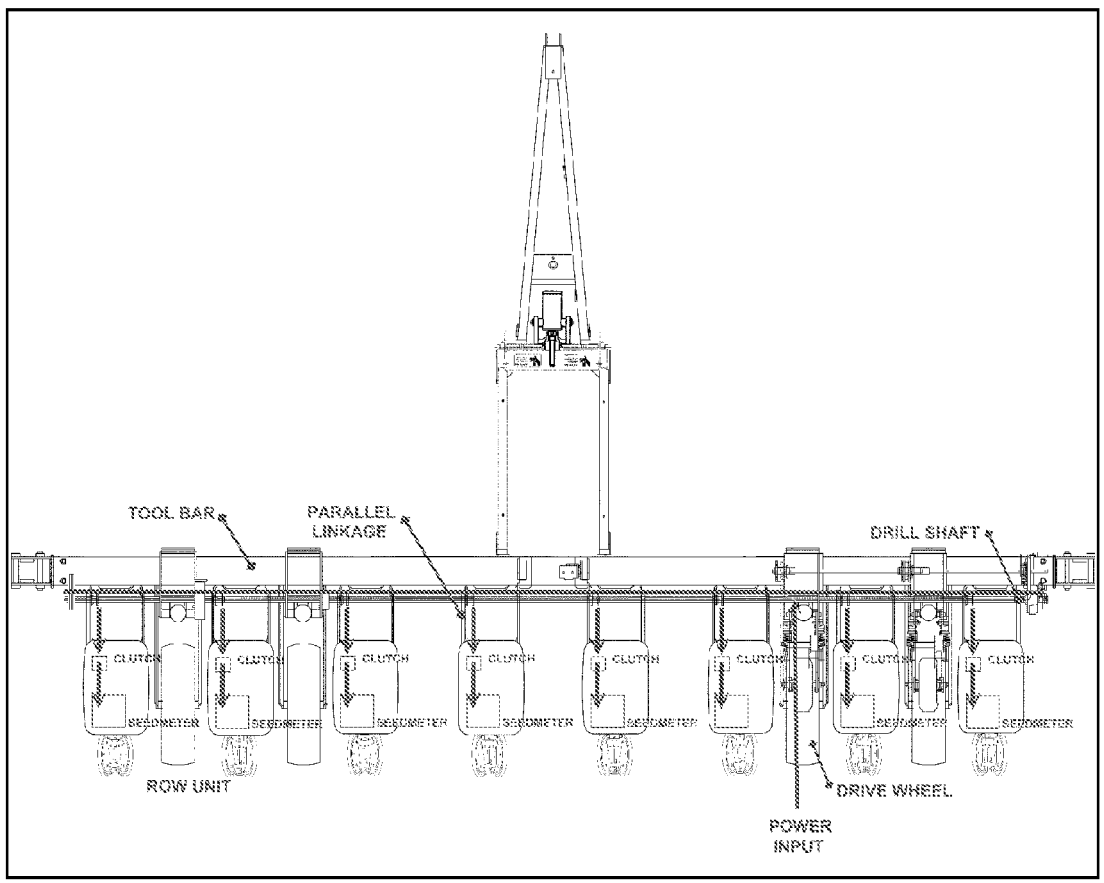
FIG. 3 is a plan view of a planter on which the present invention has been installed.

Illustrated in FIG. 3, generally at 20, is an eight-row planter implement that has a transversely extended tool bar 22 on which is mounted eight closed row units 24 for planting eight rows of seed simultaneously in a field. Each row unit 24 includes a clutch assembly 26 interposed between a seed meter 28 and the drill shaft 8. The drill shaft 8 is mounted parallel to the tool bar 22 and is rotated by a ground supported drive wheel 32 at a rate proportional to the speed of the planter implement 20 as it is drawn across a field. Each row unit 24 is mounted to the tool bar 22 using a parallel linkage system 34 to allow the row units 24 to float up and down relative to the tool bar 22.

Figures 4A, 4B:
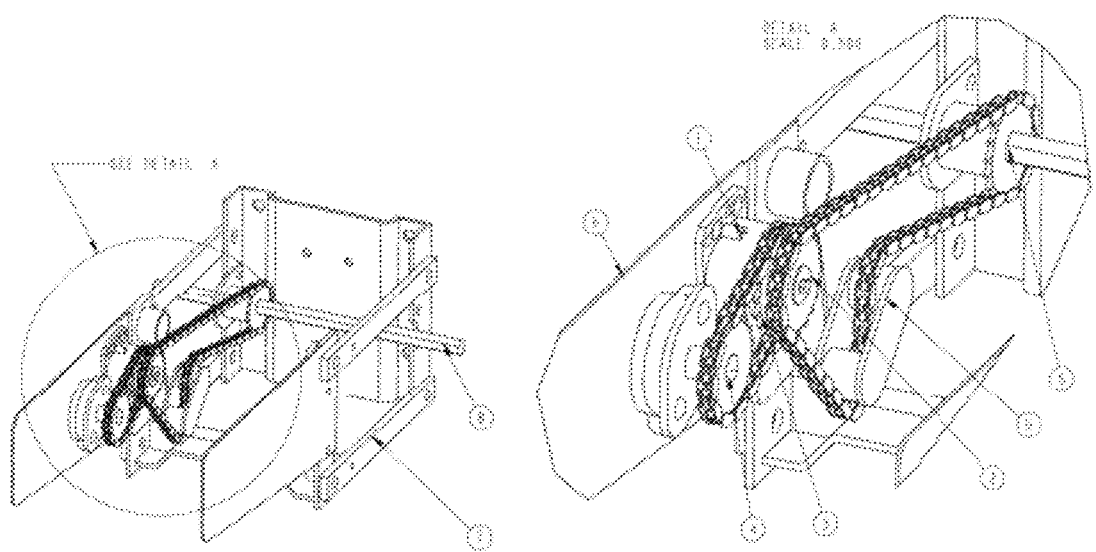
Figure 5:
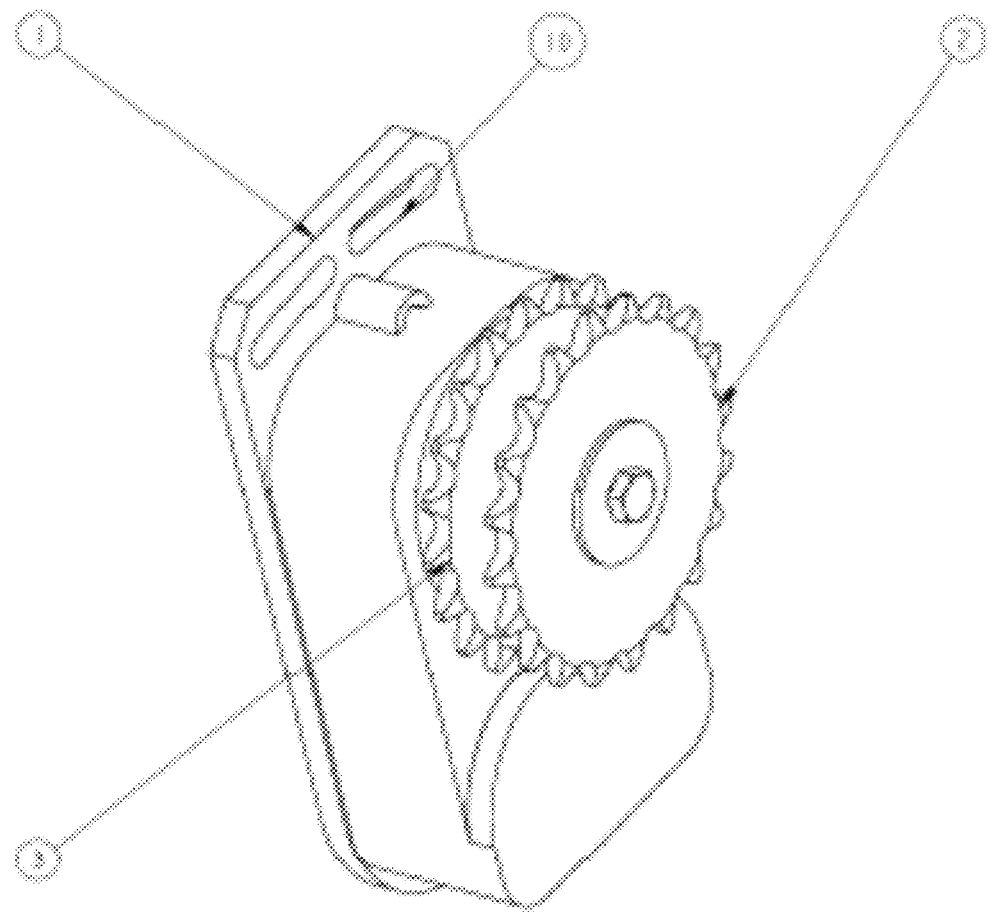
FIG. 5 is an enlarged perspective view of an electrically controlled clutch.
Figure 6:
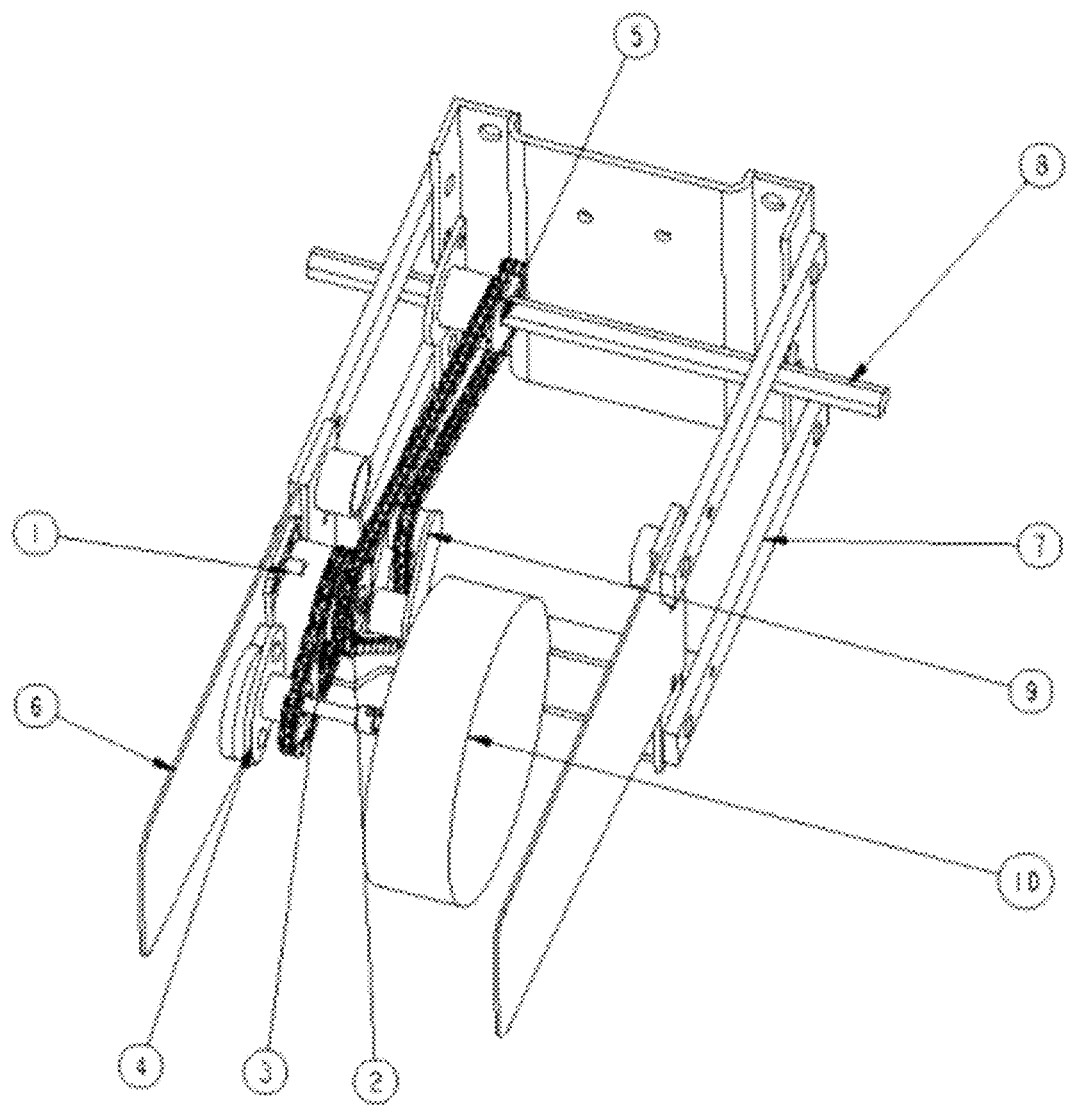
FIG. 6 is a perspective view of the assembly of FIGS. 4a and 4b further showing a seed meter.

FIGS. 4 and 6 depict individual row units 24 with parts broken away to show the interior components. A lower bar of the parallel linkage 34 is illustrated at 7. For each row unit 24, mounted on the drill shaft 8 is a driving sprocket 5 that is rotated by the drill shaft 8 at a speed proportional to the ground speed of the planter implement 20. An electronically controlled clutch unit 1 is mounted on the inside of a side wall 6 of the row unit 24. As shown in more detail in FIG. 4, the clutch unit 1 includes a pair of slotted mounting holes 14 that are used to mount the clutch unit 1 on the side wall 6 of the row unit 24. Projected from the clutch unit 1 are a pair of sprockets, input sprocket 2 and output sprocket 3. The clutch unit 1 is operated by electric control signals to engage and disengage the output sprocket 3 from the input sprocket 2.

Referring again to FIGS. 4 and 6, the input sprocket 2 is aligned with the driving sprocket 5. A driving chain 11 drivably interconnects the driving sprocket 5 and the input sprocket 2 and is maintained in tension by a chain tensioner 9 upon floating movement of the row unit 24.

A seed meter 10 is mounted inside the row unit 24 and is operated in response to rotation of shaft 12 supported in a bearing 13 mounted on the side wall 6 of the row unit 24. The seed meter 10 dispenses seed under preset conditions when the shaft 12 is rotated. A seed meter driven sprocket 4 is mounted on the shaft 12 in line with the output sprocket 3. A seed meter driving chain 15 interconnects the output sprocket 3 and the driven sprocket 4 so that rotation of the output sprocket 3 rotates the shaft 12 which in turn operates the seed meter 10. Accordingly, each seed meter 10 of each row unit 24 can be individually controlled to dispense or not dispense seed in response to electrical control signals received by the corresponding clutch unit 1.

Mounting the clutch unit 1 inside the row units keeps the clutch unit 1 out of the way of between the row lift wheels and also protects the clutch unit 1 from flying debris from lift wheels or objects moving between row units 24 such as stalks. More clearance between rows enables use of wider lift wheels or narrower row spacing. It also allows the lift wheels to move higher relative to the row unit 24.

The clutch assemblies of the present invention make installation easier and less time consuming compared to pneumatic sprocket clutch that requires removal of the drill shaft 8. In addition, the inside of the row unit 24 is more accessible to a retrofit installer than the drill shaft 8. The clutch assemblies also make servicing of the clutch unit 1 much easier and less time consuming compared to pneumatic sprocket clutches that mount on drill shaft 8. Removing the drill shaft 8 to repair or replace a clutch is an unwanted time consuming process, especially when it prevents use of planting implement 20 during planting season.

Mounting the clutch unit 1 to the main part of the row unit 24 allows use of the standard chain tensioner device 9. Mounting the clutch unit 1 to the main part of the row unit also prevents the up and down action of the parallel arms from moving the clutch unit 1 and seed meter 10 up and down relative to each other so that the chain 15 connecting the output sprocket 3 to the seed meter driven sprocket 4 does not require a chain tensioner device that automatically adjusts as the row unit 24 moves up and down relative to the toolbar 22. The slotted mounting holes 14 of the clutch unit 1 provide for periodic tightening of the chain 15 between the clutch output sprocket 3 and seed meter driven sprocket 4.

Since the clutch unit 1 is driving only one seed meter 10, the reduced torque allows for the clutch unit 1 to actuate with a low current electric solenoid. This eliminates the extra expense of an air compressor device and electric over air valve components. It also eliminates extra installation time and service of these components. In a preferred embodiment, the clutch units 1 are wrap spring clutches of a type generally as described in U.S. Pat. No. 4,550,860, which is incorporated herein by reference, operated in response to 12 V, 330 milliamp, electrical signal.

A control apparatus is mounted preferably in the tractor for pulling the planting implement 20 for easy access by an operator. One such system is the SeedCommand™ system sold by Ag Leader Technology, Ames, Iowa. The control apparatus sends an electrical control signal to the clutch unit 1 to disengage the clutch unit 1 thereby interrupting dispensing of seed from the seed meter 10. One application of the control apparatus would make use of a GPS system that would record where seed was dispensed during a planting operation and interrupt planting of seed by individual row units 24 that would otherwise overlap areas already planted.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

We claim:

1. Clutch apparatus for a planter implement, said planter implement having a drill shaft and a plurality of row units each including a seed meter, said clutch apparatus comprising:
   (a) a clutch mounted to each of the plurality of row units selectively operably interconnecting the drill shaft and the seed meter;
   (b) an input of the clutch driven off of the drill shaft;
   (c) an output of the clutch operably connected to the seed meter;
   (d) control apparatus for disengaging a selected one or more of the clutches to stop rotation of the output and interrupt dispensing of seed from the corresponding row unit by the seed meter.

2. The apparatus of claim 1, wherein the clutch is electrically controlled.

3. The apparatus of claim 1, wherein the input and output of the clutch comprise sprockets.

4. The apparatus of claim 3, wherein a chain interconnects the drill shaft and the input sprocket.

5. The apparatus of claim 3, further comprising a drive shaft rotatably connected to the seed meter.

6. The apparatus of claim 5, further comprising a driven sprocket mounted on the drive shaft and a chain interconnecting the output sprocket and the driven sprocket.

7. The apparatus of claim 1, wherein the clutch is located inside the row unit.

* * * * *